United States Patent [19]
Robinson

[11] Patent Number: 5,419,363
[45] Date of Patent: May 30, 1995

[54] PLUMBING ADAPTER

[75] Inventor: Joseph D. Robinson, Gardena, Calif.

[73] Assignee: Henry M. Bissell, Los Angeles, Calif.; a part interest

[21] Appl. No.: 279,408

[22] Filed: Jul. 25, 1994

[51] Int. Cl.6 .......................... F16L 5/00; A61H 35/00
[52] U.S. Cl. .......................................... 137/360; 4/448; 251/148
[58] Field of Search ...................... 4/443, 448, DIG. 7; 251/148; 285/348; 137/360

[56] References Cited

U.S. PATENT DOCUMENTS

| | | | |
|---|---|---|---|
| 2,178,278 | 10/1939 | Campbell et al. | 285/348 |
| 2,192,565 | 3/1940 | Szekely | 285/348 |
| 2,604,477 | 8/1949 | Monserrat. | |
| 3,015,826 | 1/1962 | Aranas. | |
| 3,425,066 | 2/1969 | Berger | 4/448 |
| 4,181,985 | 1/1980 | Rivs | 4/448 |
| 4,596,058 | 5/1986 | Nourbakhsh. | |
| 5,056,755 | 10/1991 | Jang et al. | 251/148 |
| 5,090,067 | 2/1992 | Cogdill. | |
| 5,138,726 | 8/1992 | Campbell. | |

*Primary Examiner*—A. Michael Chambers
*Attorney, Agent, or Firm*—Henry M. Bissell

[57] ABSTRACT

A plumbing adapter for installation in series with a flexible conduit leading to a plumbing fixture, such as a toilet tank or a kitchen or bathroom sink. The adapter has a first end suitable for engagement in sealing relationship with the terminal end of the conduit and an opposite, second end configured to engage the coupling portion of the plumbing fixture in sealing relationship. A threaded side extension having an opening communicating with the water passage within the adapter is provided for coupling to an auxiliary appliance through which water is to be supplied.

18 Claims, 1 Drawing Sheet

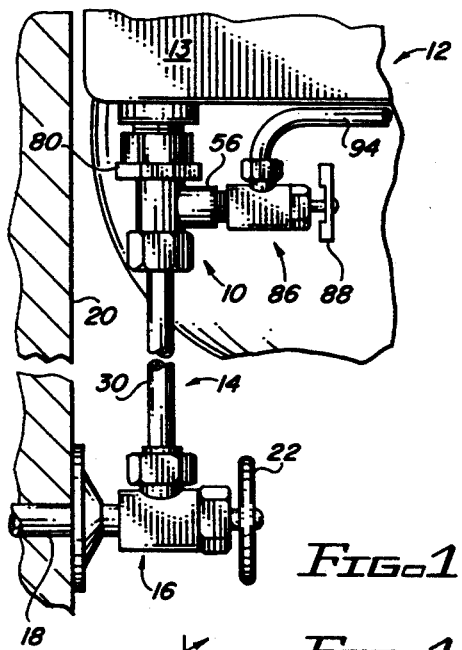
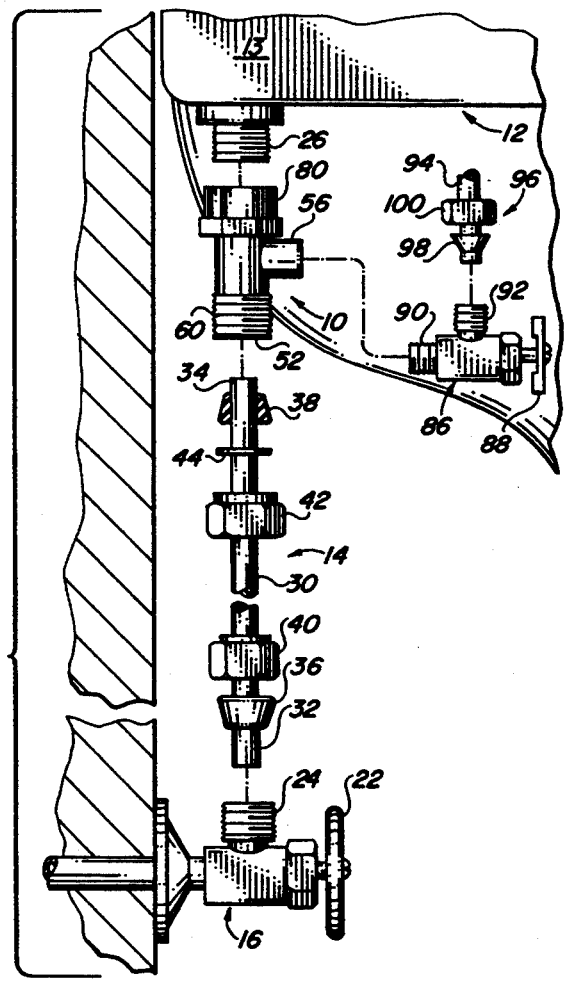
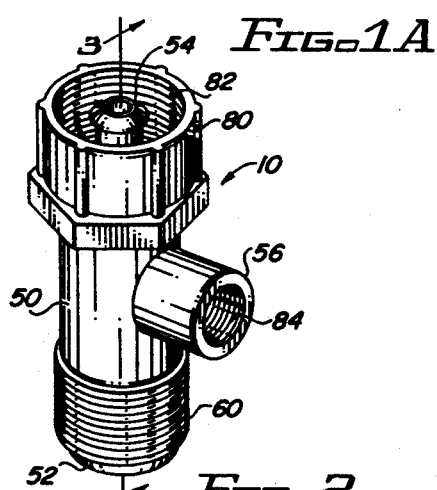
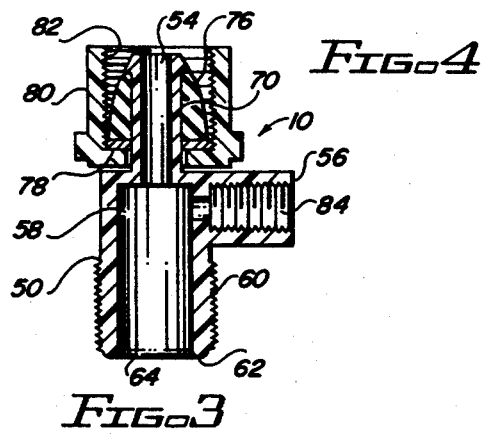
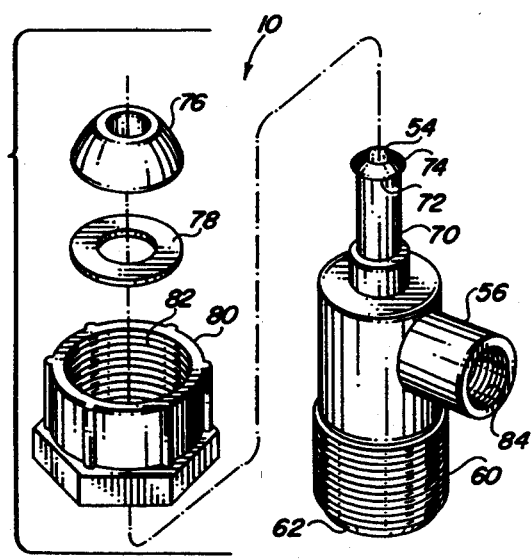
FIG. 1
FIG. 1A
FIG. 2
FIG. 3
FIG. 4

PLUMBING ADAPTER

BACKGROUND OF THE INVENTION

1. Field of the Invention

This invention relates to adapters for residential plumbing and, more particularly, to such adapters for coupling an auxiliary appliance to the water line for a toilet tank, sink faucet or the like.

2. Description of the Related Art

In residential plumbing, the water lines which lead to fixtures such as the faucets in kitchen sinks, bathroom sinks and the like, as well as to the ballcock valve assemblies in toilet tanks, generally comprise a tube which extends from the termination of the installed plumbing line at the location of the fixture to the fixture itself. The termination of the installed plumbing line is usually an element known as an angle-stop. This comprises a fitting having a valve which threads onto the end of the pipe where it comes through the wall and delivers water in a direction at right angles to the pipe. The connection between the angle-stop and the fixture is generally by way of a flexible tube or conduit, either plastic or ductile metal such as copper, which is provided with properly sized compression couplings at both ends to make the watertight connections at the angle-stop and at the fixture. The reason this tube is constructed as described is to accommodate for misalignments between the angle-stop and the fixture, as well as to permit the ready removal and repair or replacement of the particular fixture.

In many cases, it is desirable to couple an auxiliary appliance to a plumbing line in a bathroom or kitchen. One example where such a connection is needed adjacent a toilet fixture is for a certain personal hygiene attachment for toilets, sometimes referred to as a bidet attachment. Such devices may include a handheld spray attachment to a flexible hose or a specially designed spray fixture which is adapted to be mounted to extend within the toilet below the toilet bowl rim. Examples of such devices are to be found in the following U.S. Pat. Nos.: 2,605,477 of Monserrat, 3,015,826 of Aranas, 3,425,066 of Berger, 4,596,058 of Nourbakhsh, 5,090,067 of Cogdill, and 5,138,726 of Campbell, to name a few.

In many cases, such auxiliary appliances are installed by way of special plumbing connected directly to the residence water lines. Of the prior art examples listed, such special plumbing installations are to be found in the patents of Monserrat, Aranas and Nourbakhsh. Cogdill calls for modification of the toilet tank itself. Such special installations require the work of a plumber or the skills of one if the homeowner is to perform the job himself. Such plumbing skills are also required if the auxiliary appliance is to be removed or temporarily disconnected for repairs or adjustment.

As an alternative to a specially installed plumbing arrangement for an auxiliary appliance, a device known as a "saddle tee" or "T-tap" is commonly used. This is an element which fastens in place by encircling the conduit from the water supply pipe. A hole is drilled through an opening in the saddle tee which has a collar that permits coupling of the water conduit. Compression seals are provided so that the assembly as installed does not leak. Such a attachment device is disclosed in the Campbell patent. The drawbacks of such an arrangement are obvious: the best designs of saddle tees are prone to leakage and corrosion; and if the appliance is ever to be removed, there is a hole in the water pipe so that the pipe has to be replaced.

The auxiliary appliance in the Berger patent is attached to the water line by installing a standard plumbing tee at the outlet of the angle-stop to which the flexible tube leading to the toilet tank ballcock assembly is coupled. A standard valve is coupled to the side outlet of the tee to control water flow to the auxiliary appliance.

Angle-stops come in a variety of sizes. Thus, to use a plumbing tee installation as shown in Berger, one must select a tee of the same size as the outlet of the angle-stop. Moreover, since conventional plumbing tees are constructed with male threads, as is also the outlet of the conventional angle-stop, an installation as depicted in the Berger patent requires the addition of a coupling, also the same size as the angle-stop, to connect the plumbing tee to the angle-stop. This results in an unsightly and bulky installation which is rather cumbersome, to say the least.

In addition to the auxiliary appliances which are connected to standard plumbing in a bathroom, it is not uncommon to have appliances coupled to the water line feeding a faucet in the kitchen sink. Examples of such appliances are the ice-maker of a refrigerator/freezer, an electric water heater for dispensing high temperature water for instant coffee or tea, water filtering devices, drinking water dispensers and the like, Saddle tees are commonly used for such auxiliary appliance installations with the usual drawbacks described above.

Although angle-stops, whether for plumbing to a sink faucet in the kitchen or bathroom or to a toilet tank valve, come in a variety of sizes, the threaded coupling to the ballcock assembly or other toilet tank valve is almost invariably of the same physical size, thread specification, etc.—i.e., identical from one to the next. In other words, for all of the different sizes of flexible conduits which connect between the angle-stop and the toilet tank fitting which are required in order to establish a match with the size of the angle stop, the coupling at the end which threads onto the toilet tank fitting is always the same size. A similar situation obtains with respect to the fittings for sink faucets, although these fittings are smaller than the toilet tank fittings. Even so, the conduits extending between the angle-stop and the faucet fitting come in a variety of sizes to adapt to the particular size of angle stop while all have couplings the same size and configuration to their outlet ends.

To take advantage of this particular situation, I have devised a very simple and compact, readily installed adapter which greatly simplifies the problem of providing a plumbing connection for the installation of an auxiliary appliance to an existing plumbing system. With my invention only two sizes of adapters are required to accommodate all of the different connections I have described hereinabove: one size for the toilet tank fitting and another size for the faucet fitting. These adapters are identical in concept, construction and function, differing only in size selected for their specific utilization.

This simplification is made possible because the adapter is constructed so as to couple between the flexible conduit extending from the angle-stop and the particular fixture, either faucet or toilet tank, which is involved. This simplification in product design makes it much easier for the home owner to select the particular adapter that is needed (merely specifying whether it is for a toilet or a sink), reduces the inventory requirements in stocking the products required, greatly simplifies the task of installing the auxiliary plumbing appliance, and results in improved appearance of the final installation. There is no modification of existing plumbing and if the appliance is to be removed or disconnected, the adapter of my invention may be easily removed and the plumbing restored to its original condition.

SUMMARY OF THE INVENTION

In brief, arrangements in accordance with the present invention comprise a plumbing adapter having an inlet end, a first outlet end in line with the inlet end and a second outlet end extending to the side. Each of these ends has an opening communicating with a central water passage. The inlet end is threaded and shaped so that it may be engaged in sealing relationship with a flexible water conduit leading to a plumbing fixture. The flexible conduit is generally installed on the outlet of an angle-stop which is connected to a plumbing line.

The first outlet end is provided with a resilient sealing member and a rotatable coupling nut which are shaped and sized to engage a coupling portion of the plumbing fixture in sealing relationship. The second outlet end extending to the side of the adapter is threaded for engagement with an element such as a needle valve coupled to an auxiliary plumbing appliance.

Looking at it another way, the inlet end of the adapter is configured like the coupling portion of the plumbing fixture so that the outlet end of the flexible conduit which normally attaches to the plumbing fixture can instead be connected to the adapter. Similarly, the first outlet end of the adapter is configured like the outlet end of the standard flexible conduit so that it can be connected to the plumbing fixture in place of the outlet end of the conduit. Tightening the rotatable coupling nut of the conduit onto the adapter serves to compress the seal at the end of the conduit, thus providing a leak-proof junction. In similar fashion, tightening the coupling nut at the first outlet end of the adapter onto the threaded coupling portion of the plumbing fixture serves to compress the resilient sealing member at the first outlet end, thereby also establishing a leak-proof coupling. Threading a needle valve into the side outlet of the adapter renders that coupling leak-proof as well.

The entire procedure of uncoupling the conduit, inserting the adapter in place and tightening the coupling elements or removing an installed adapter and restoring the conduit in place can be easily accomplished in less than five minutes, using only a pair of pliers or a small wrench. The adapter of my invention is constructed of sturdy materials which are highly corrosion resistant and should last the lifetime of any plumbing system. Its design and construction are such that it can be marketed at a modest price. It takes the place of more cumbersome and costly alternatives which are known in the prior art and make it possible for any home owner or renter to install an auxiliary appliance in a water line leading to a kitchen or bathroom sink faucet or a toilet tank without the need for any plumbing or other special skills whatsoever. Moreover, if desired, the appliance can be readily removed and the plumbing restored to its original condition just as easily.

DESCRIPTION OF THE DRAWINGS

A better understanding of the present invention may be realized from a consideration of the following detailed description, taken in conjunction with the accompanying drawings, in which:

FIG. 1 is a schematic elevational view showing the installation of an adapter in accordance with my invention in a water line supplying a plumbing fixture;

FIG. 1A is a partially exploded view of FIG. 1;

FIG. 2 is a perspective view of the adapter of my invention;

FIG. 3 is a sectional view taken along the line 3—3 of FIG. 2, looking in the direction of the arrows; and FIG. 4 is an exploded view of the adapter of FIG. 2.

DETAILED DESCRIPTION OF THE PREFERRED EMBODIMENTS

FIGS. 1 and 1A of the accompanying drawings show an adapter in accordance with the present invention as it would be installed in use. These figures show a typical installation of a flexible water conduit 14 coupled between an angle-stop 16 and a plumbing fixture 12. The angle-stop 16 is connected to a water pipe 18 which extends through a wall 20. The plumbing fixture 12 may be a bathroom toilet in one example, in which case the portion 13 will be understood to represent the bottom of a toilet tank with a threaded portion 26 leading to a ballcock or other valve assembly within the toilet tank. Alternatively, the plumbing fixture 12 may be a bathroom sink faucet or a kitchen sink faucet, in which case the portion 13 represents the segment at the rear of the sink on which the faucets are installed and the threaded portion 26 represents the water inlet to the one of the faucets.

The angle-stop 16 has a handle 22 and a threaded outlet portion 24. The standard flexible conduit 14 comprises a tube 30 having a resilient sealing member 36 and coupling nut 40 on its lower end 32. Similarly, the tube 30 has a resilient sealing member 38 and rotatable coupling nut 42 on its upper end 34. A bearing washer 44 is shown between the seal 38 and nut 42. A similar bearing washer (not shown) is commonly provided on the lower end 32. These washers serve to compress the sealing members 36, 38 as the coupling nuts 40, 42 are tightened on their respective connections 24, 26, thus establishing a leak-proof coupling at each end when the conduit 14 is properly installed. Turning the handle 22 to open the valve of the angle-stop 16 delivers water to the plumbing fixture 12.

As indicated in FIGS. 1 and 1A, an adapter 10 in accordance with my invention is installed between the upper end 34 of the conduit 14 and the plumbing fixture 12. The adapter 10 is so constructed that its lower or inlet end 52 may be coupled to the upper end 34 of the conduit 14 by threading the nut 42 onto the threads 60. Its upper, first outlet end 54 is coupled to the fixture 12 by threading the nut 80 at the upper end of the adapter 10 onto the threaded coupling portion 26 of the plumbing fixture 12.

Structural details of the adapter 10 are shown in FIGS. 2–4. There the adapter 10 is shown with a body 50 having an inlet 52, a first outlet 54 and a second outlet 56. The inlet 52 and outlets 54, 56 are interconnected with a central water passage 58. The inlet end 52 is formed with external male threads 60 extending from a rounded lip 62 at the bottom of the adapter 10 having a beveled inner surface 64. The first outlet 54 is in line with the inlet end 52 while the second outlet 56 extends transversely from a side of the adapter 10.

The upper end of the adapter 10 is formed with a reduced diameter portion 70 terminating in a shoulder portion 72 which extends radially outward from the reduced diameter. This terminates in a beveled surface 24 and serves as a retaining member for a resilient seal 76, bearing washer 78 and rotatable nut 80. The nut 80 is formed with internal female threads suitable for threading on the coupling portion 26 of the fixture 12.

The side outlet 56 has a threaded bore 84 designed to receive a needle valve 86 having a threading coupling 90 which threads into the bore 84 or some other coupling device. The needle valve 86 has another threaded coupling 92 into which a compression fitting 96 on the end of a tube 94 leading to an auxiliary appliance may be installed. The compression fitting 96 comprises a sealing ferrule 98 and a coupling nut 100.

The angle-stop 16 may be of any suitable size. There is a significant variation in sizes of the threaded coupling portion 24. Thus, the flexible conduit 14 is necessarily selected to match the size of the coupling portion 24. On the other hand, the coupling portion 26 of the plumbing fixture 12 is customarily one of only two standard sizes. There is one size for a toilet tank fitting and another size for faucets. Accordingly, the upper end of the flexible conduit 14 is one of only two corresponding sizes. Thus, by placing the adapter 10 in the location shown in FIGS. 1 and 1A the adapter 10 can be made in only two sizes, one to fit onto a toilet tank fitting; the other to fit onto a sink faucet fitting. This advantageously reduces the number of adapters of my invention that must be stocked for suitable inventory.

By virtue of the novel features of my invention and the advantageous results from the use thereof, anyone who so desires is enabled to connect an auxiliary water appliance into existing water lines leading to a sink or toilet without the need for any special skills or knowledge. Products constructed in accordance with my invention are rugged and long lasting. They are esthetically pleasing and yet unobtrusive when installed. They can be manufactured to sell at low cost and are maintenance free. They represent a substantial improvement over alternative approaches to solving the associated problems which are known in the prior art. Finally, the installation of an adapter of my invention does not create any alteration in the plumbing per se, so that if and when it is removed, the plumbing is restored to original condition. This adapter can be installed and removed without violating any building codes or incurring objections from landlords, homeowner associations and the like.

Although there have been described hereinabove various specific arrangements of a plumbing adapter in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A plumbing adapter for installation in a water line between a standard flexible conduit having at least one rotatable coupling thereon with one end coupled to an angle-stop and a plumbing fixture having a coupling portion to which the rotatable coupling is attachable, said adapter comprising:
   a body having first and second opposed ends with openings therein, a side opening and an internal water passage interconnecting all of said openings;
   said first end having a threaded portion with a series of external male threads thereon and a terminal lip formed with a beveled inner surface about said first end opening, said threads, lip and first end opening being shaped and dimensioned to mate in sealing relationship with said standard flexible conduit when the rotatable coupling is threaded onto said external male threads;
   said second end having a portion of reduced diameter terminating in a shoulder portion which extends radially outward from said reduced diameter, said shoulder portion having a beveled outer surface;
   a resilient generally cylindrical sealing member positioned on said reduced diameter portion axially inboard of said shoulder portion and retained thereby;
   a rotatable coupling nut with an internal threaded portion bearing female threads positioned on said reduced diameter portion and retained by the sealing member;
   said shoulder portion, sealing member and rotatable coupling nut being shaped and dimensioned to mate in sealing relationship with the coupling portion of said plumbing fixture; and means for coupling an auxiliary appliance to said side opening.

2. A plumbing adapter for installation in a water line between a standard flexible conduit having a first resilient sealing member and a first rotatable coupling nut mounted on one end thereof and a plumbing fixture having a threaded coupling portion to which the rotatable coupling nut is attachable, said adapter comprising:
   a body having first and second opposed ends with openings therein, a side opening and an internal water passage interconnecting all of said openings;
   said first end being threaded and shaped to mate in sealing relationship with said one end of the conduit when said first coupling nut is threaded onto said first end;
   a second resilient sealing member;
   a second rotatable coupling nut;
   means on said second end for mounting and retaining the second resilient sealing member and the second coupling nut thereon;
   said second end with said second resilient sealing member and said second coupling nut being shaped and dimensioned to mate in sealing relationship with the threaded coupling portion of said plumbing fixture when the second coupling nut is threadably engaged thereon; and
   means for coupling an auxiliary appliance to said side opening.

3. The adapter of claim 2 wherein said first end includes a threaded portion with a series of external male threads thereon and a terminal lip formed with a beveled inner surface about said first end opening.

4. The adapter of claim 3 wherein said threads, lip and opening of said first end are shaped and dimensioned to provide a leak-proof seal with said standard flexible conduit when the first rotatable coupling nut is threaded onto said threaded portion of said first end.

5. The adapter of claim 3 wherein said retaining means on said second end include a portion of reduced diameter terminating in a shoulder portion which extends radially outward from said reduced diameter.

6. The adapter of claim 5 wherein said shoulder portion has an beveled outer surface.

7. The adapter of claim 5 wherein said second resilient sealing member and said second rotatable coupling nut are positioned on said reduced diameter portion and retained by said shoulder portion.

8. The adapter of claim 2 wherein said retaining means, second sealing member and second rotatable coupling nut are shaped and dimensioned to mate in a sealing relationship with the threaded coupling portion of said plumbing fixture.

9. The adapter of claim 2 wherein said second resilient sealing member is hollow and generally cylindrical with a tapered forward end.

10. The adapter of claim 2 further including a bearing washer positioned between the second resilient sealing member and the second rotatable coupling nut.

11. The adapter of claim 2 wherein said means for coupling an auxiliary appliance comprise a laterally extending cylindrical portion defining said side opening and having an internally threaded bore communicating with said side opening.

12. The adapter of claim 2 wherein said body is formed of injection molded plastic, wherein said second resilient member is formed of resilient plastic material, and wherein said second coupling nut is formed of plated brass.

13. The adapter of claim 2 wherein said plumbing fixture comprises a toilet tank.

14. The adapter of claim 2 wherein said plumbing fixture comprises a sink faucet.

15. The adapter of claim 2 wherein said standard flexible conduit is installed on an angle-stop.

16. In combination:
a plumbing fixture including a hollow threaded portion to which a flexible conduit having a compression seal assembly may be threadably connected;
a flexible conduit having a first compression seal assembly at an outlet end for threadable connection to the threaded portion of said plumbing fixture; and
a hollow adapter for coupling an auxiliary appliance to said flexible conduit, the adapter having an inlet end with a threaded portion matching the threaded portion of said plumbing fixture in diameter and thread shape and spacing for establishing a leak-proof coupling to said conduit when said first compression seal assembly is threadably connected to said inlet end;
said adapter having an outlet end comprising a second compression seal assembly for establishing a leak-proof coupling to said plumbing fixture when said second compression seal assembly is threadably connected to the threaded portion of the plumbing fixture;
said second compression seal assembly comprising a rotatable nut having internal threads of a diameter and thread shape and spacing corresponding to the threaded portion of the plumbing fixture, a resilient seal member shaped to mate with the opening of the hollow threaded portion of the plumbing fixture and means for retaining said rotatable nut and resilient sealing member in position on said adapter;
said adapter further having a hollow side member for coupling to the auxiliary appliance to supply water thereto.

17. The combination of claim 16 wherein said plumbing fixture comprises a sink faucet.

18. The combination of claim 16 wherein said plumbing fixture comprises a toilet, the threaded portion thereof being connected to a valve assembly within a tank portion of the toilet.

* * * * *